US012618731B2

(12) United States Patent
Onimoto et al.

(10) Patent No.: US 12,618,731 B2
(45) Date of Patent: May 5, 2026

(54) MAGNETOSTRICTIVE TORQUE SENSOR AND METHOD FOR MANUFACTURING MAGNETOSTRICTIVE TORQUE SENSOR

(71) Applicant: Proterial, Ltd., Tokyo (JP)

(72) Inventors: Takashi Onimoto, Tokyo (JP); Kei Kawano, Tokyo (JP); Akitoshi Fujimori, Tokyo (JP)

(73) Assignee: Proterial, Ltd., Tokyo (JP)

( * ) Notice: Subject to any disclaimer, the term of this patent is extended or adjusted under 35 U.S.C. 154(b) by 326 days.

(21) Appl. No.: 18/394,255

(22) Filed: Dec. 22, 2023

(65) Prior Publication Data

US 2024/0247987 A1 Jul. 25, 2024

(30) Foreign Application Priority Data

Jan. 19, 2023 (JP) ................................. 2023-006852

(51) Int. Cl.
*G01L 3/10* (2006.01)
*G01L 3/00* (2006.01)

(52) U.S. Cl.
CPC ................ *G01L 3/102* (2013.01); *G01L 3/00* (2013.01); *G01L 3/105* (2013.01)

(58) Field of Classification Search
CPC ............ G01L 3/102; G01L 3/00; G01L 3/105
See application file for complete search history.

(56) References Cited

U.S. PATENT DOCUMENTS

| | | | |
|---|---|---|---|
| 11,774,304 B2 | 10/2023 | Okuyama et al. | |
| 11,774,305 B2 | 10/2023 | Nakamura et al. | |

(Continued)

FOREIGN PATENT DOCUMENTS

| | | | | |
|---|---|---|---|---|
| CN | 116067546 A | * | 5/2023 | ............. G01L 3/102 |
| JP | 2022-110970 A | | 7/2022 | |

(Continued)

OTHER PUBLICATIONS

CN-116067546-A, English Translation (Year: 2023).*
WO-2025220477-A1, English Translation (Year: 2025).*

*Primary Examiner* — Ryan D Walsh
(74) *Attorney, Agent, or Firm* — Studebaker Brackett PLLC

(57) ABSTRACT

A magnetostrictive torque sensor that is configured to be attached around a rotating shaft exhibiting a magnetostrictive effect and detects torque transmitted by the rotating shaft in a predetermined operating temperature range. The magnetostrictive torque sensor is provided with a molded resin body including a cylinder portion with a hollow cavity in a center through which the rotating shaft is inserted, a flexible substrate that is wrapped around an outer circumference of the cylinder portion of the molded resin body and includes a plurality of detection coils composed of a wiring pattern, a cylindrical magnetic ring that houses the flexible substrate between the magnetic ring and the cylinder portion, and a filler composed of a curable resin filled between the cylinder portion, the flexible substrate, and the magnetic ring. A linear expansion coefficient of the molded resin body is higher than a linear expansion coefficient of the magnetic ring, and the filler is cured in a state in which temperatures of the cylinder portion, the flexible substrate, and the magnetic ring are elevated to higher than an upper limit temperature of the operating temperature range.

8 Claims, 10 Drawing Sheets

(56)                References Cited

U.S. PATENT DOCUMENTS

2022/0228935  A1      7/2022   Okuyama et al.
2022/0244118  A1      8/2022   Nakamura et al.
2024/0319029  A1 *    9/2024   Fujimori  ................. G01L 3/102
2024/0418586  A1 *   12/2024   Jin  .......................... G01L 3/102
2025/0123166  A1 *    4/2025   Jin  .......................... G01L 3/102

FOREIGN PATENT DOCUMENTS

JP           2022-117292  A      8/2022
WO      WO-2025220477  A1 *  10/2025   .............. G01L 3/10

* cited by examiner

MAGNETOSTRICTIVE TORQUE SENSOR AND METHOD FOR MANUFACTURING MAGNETOSTRICTIVE TORQUE SENSOR

CROSS-REFERENCE TO RELATED APPLICATIONS

The present application is based on Japanese patent application No. 2023-006852 filed on Jan. 19, 2023, the entire contents of which are incorporated herein by reference.

TECHNICAL FIELD

The present invention relates to a magnetostrictive torque sensor to detect torque transmitted by a rotating shaft, and a method for manufacturing the same.

BACKGROUND OF THE INVENTION

Conventionally, magnetostrictive torque sensors are used to detect torque of, e.g., an output rotating shaft of an automobile engine. Magnetostrictive torque sensors are configured to detect torque applied to a rotating shaft based on changes in the inductance of a detection coil placed around the rotating shaft, using the magnetostrictive effect in which the magnetic permeability of the rotating shaft changes due to stress. The present applicant has proposed magnetostrictive torque sensors which have a flexible substrate having plural detection coils formed thereon and placed around a rotating shaft, and detect torque applied to the rotating shaft based on changes in the inductances of the plural detection coils (see Patent Literatures 1 and 2).

The torque sensors described in Patent Literatures 1 and 2 have a cylindrical bobbin through which a rotating shaft is inserted at the center thereof, a flexible substrate curved and wrapped around the outer surface of the bobbin, and a cylindrical magnetic ring that covers a periphery of the flexible substrate. The bobbin is made of a non-magnetic material such as resin. The flexible substrate has plural detection coils composed of wiring patterns formed across plural wiring layers. The magnetic ring described in Patent Literature 1 is composed of a magnetic material such as a powder magnetic core or amorphous soft magnetic material. The magnetic ring described in Patent Literature 2 is configured by wrapping an amorphous tape composed of a Fe-based or Co-based amorphous soft magnetic material around the flexible substrate. The magnetic ring serves to reduce the magnetic resistance of a magnetic circuit and suppress a decrease in sensitivity due to leakage of magnetic flux generated by the plural detection coils to the outside.

Citation List Patent Literature 1: JP2022-110970A
Patent Literature 2: JP2022-117292A

SUMMARY OF THE INVENTION

Torque sensors installed in automobiles are used in high-temperature environments of, e.g., not less than 100° C. in some cases. If the bobbin thermally expands at a higher rate than the magnetic ring at such high temperatures, the flexible substrate is strongly pressed toward the magnetic ring due to the thermal expansion of the bobbin. If the flexible substrate is pressed, the spaces between the wiring layers in the thickness direction of the flexible substrate are narrowed and this causes changes in capacitance, which may adversely affect torque detection accuracy.

Therefore, it is an object of the invention to provide a magnetostrictive torque sensor that has a flexible substrate having plural detection coils formed by wiring patterns and in which the flexible substrate is placed between a cylinder portion of a molded resin body and a magnetic ring located on the outer side and strong pressing of the flexible substrate in a thickness direction when at high temperatures can be suppressed, and a method for manufacturing such a magnetostrictive torque sensor.

To solve the problem described above, the invention provides a magnetostrictive torque sensor that is configured to be attached around a rotating shaft exhibiting a magnetostrictive effect and detects torque transmitted by the rotating shaft in a predetermined operating temperature range, the magnetostrictive torque sensor comprising:

a molded resin body comprising a cylinder portion with a hollow cavity in a center through which the rotating shaft is inserted;

a flexible substrate that is wrapped around an outer circumference of the cylinder portion of the molded resin body and comprises a plurality of detection coils composed of a wiring pattern;

a cylindrical magnetic ring that houses the flexible substrate between the magnetic ring and the cylinder portion; and a filler comprising a curable resin filled between the cylinder portion, the flexible substrate, and the magnetic ring, wherein a linear expansion coefficient of the molded resin body is higher than a linear expansion coefficient of the magnetic ring, and wherein the filler is cured in a state in which temperatures of the cylinder portion, the flexible substrate, and the magnetic ring are elevated to higher than an upper limit temperature of the operating temperature range.

Advantageous Effects of the Invention

According to the magnetostrictive torque sensor and the method for manufacturing the same of the invention, it is possible to suppress strong pressing of the flexible substrate in the thickness direction when at high temperatures.

DETAILED DESCRIPTION OF THE INVENTION

Embodiment

Figure 1A:
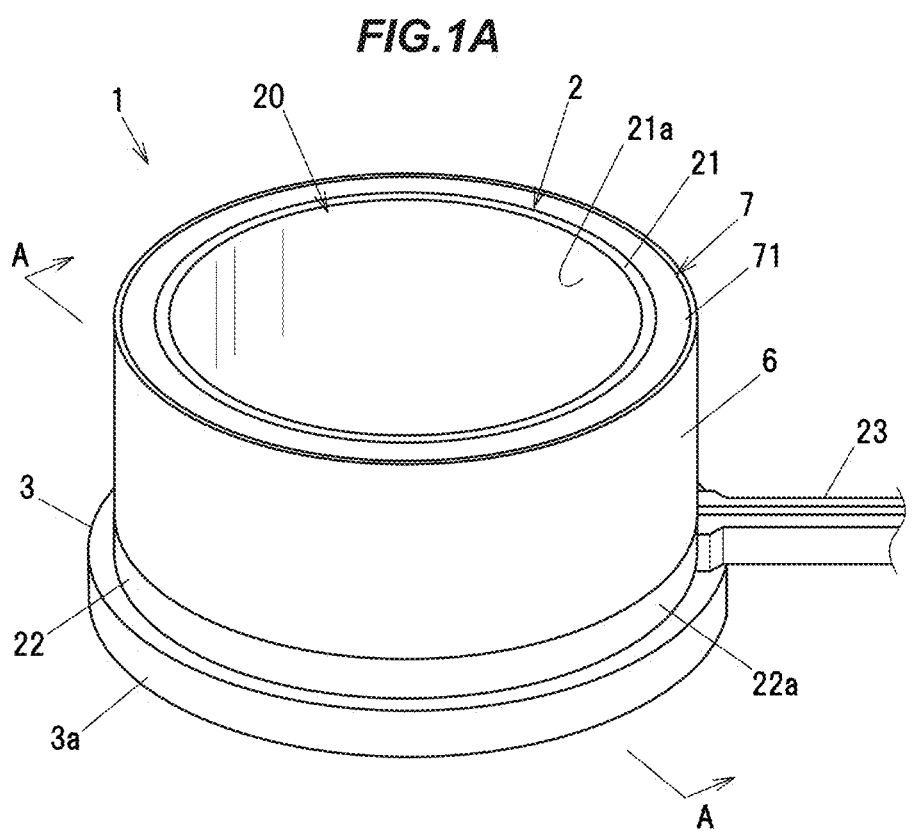
FIGS. 1A and 1B are perspective views showing a magnetostrictive torque sensor in an embodiment of the present invention.
Figure 1B:
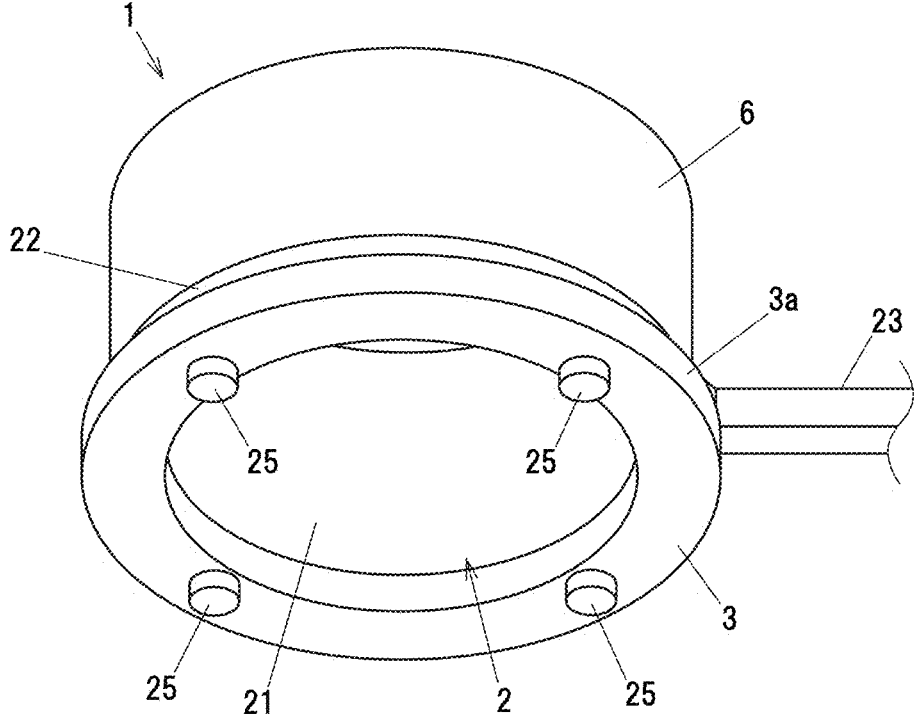
Figure 2:
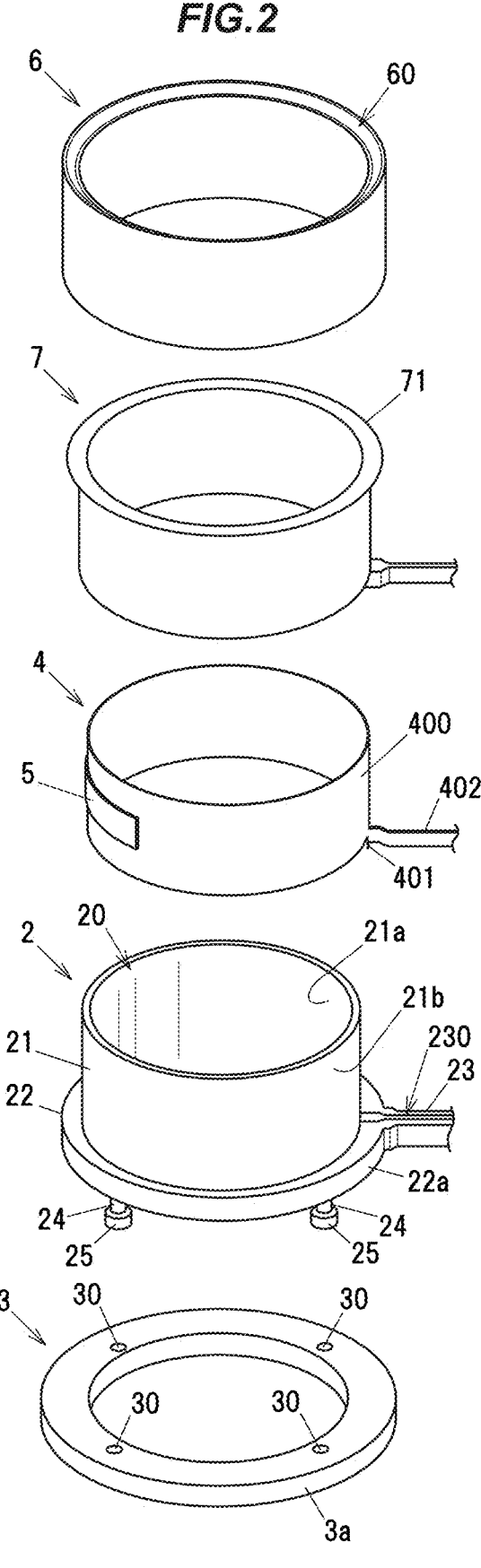
FIG. 2 is a perspective view showing components of the magnetostrictive torque sensor that are arranged vertically.
Figure 3:
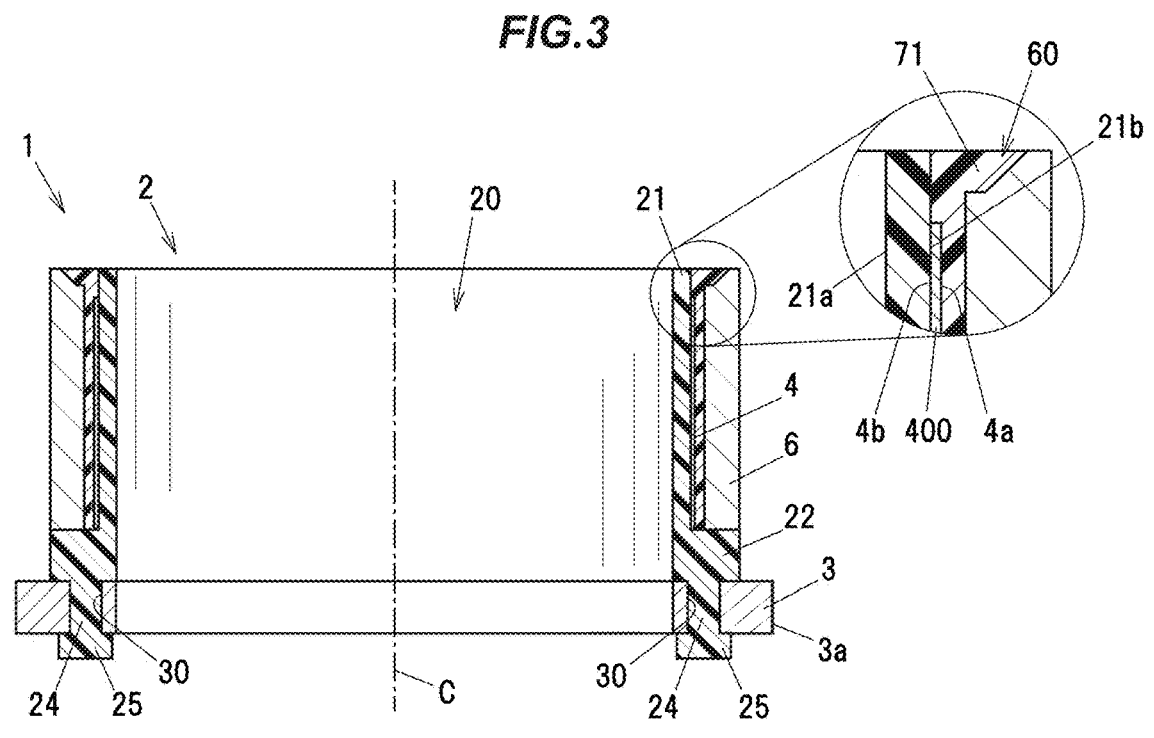
FIG. 3 is a cross-sectional view showing the magnetostrictive torque sensor taken along line A-A in FIG. 1A.
Figure 4:
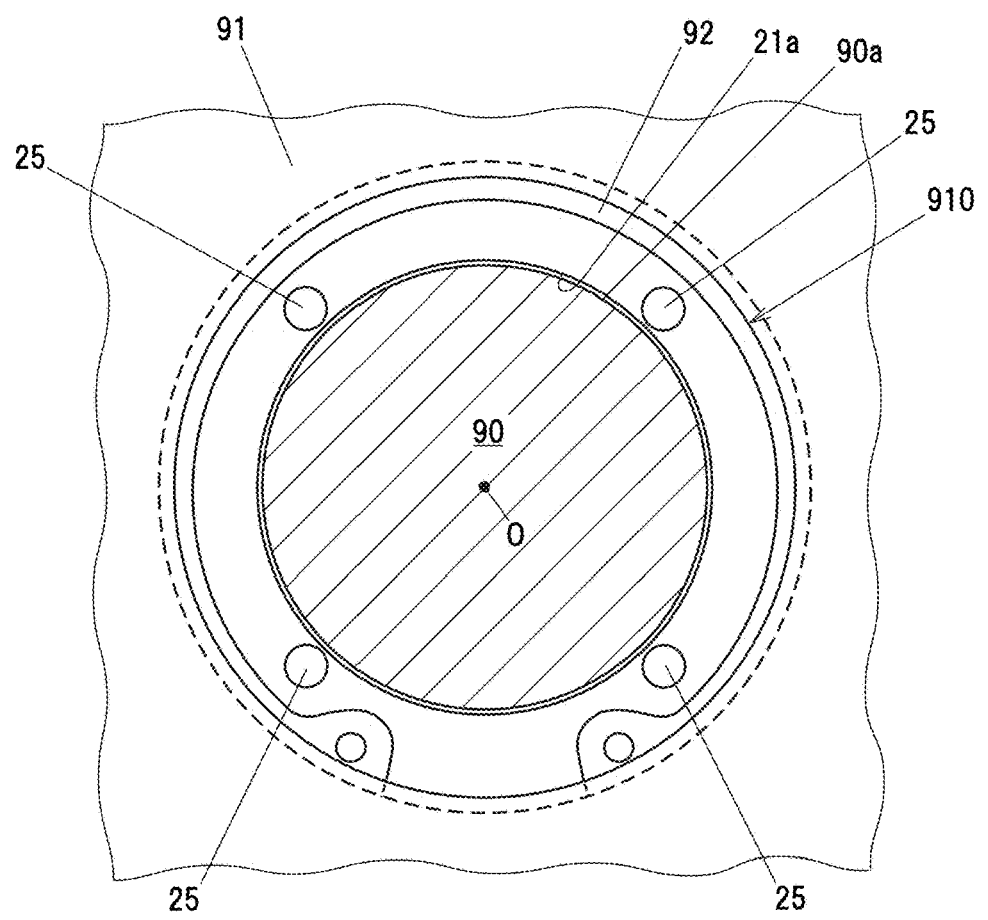
FIG. 4 is a perspective view showing the magnetostrictive torque sensor attached to a transmission case which is an attachment target.
Figure 5:
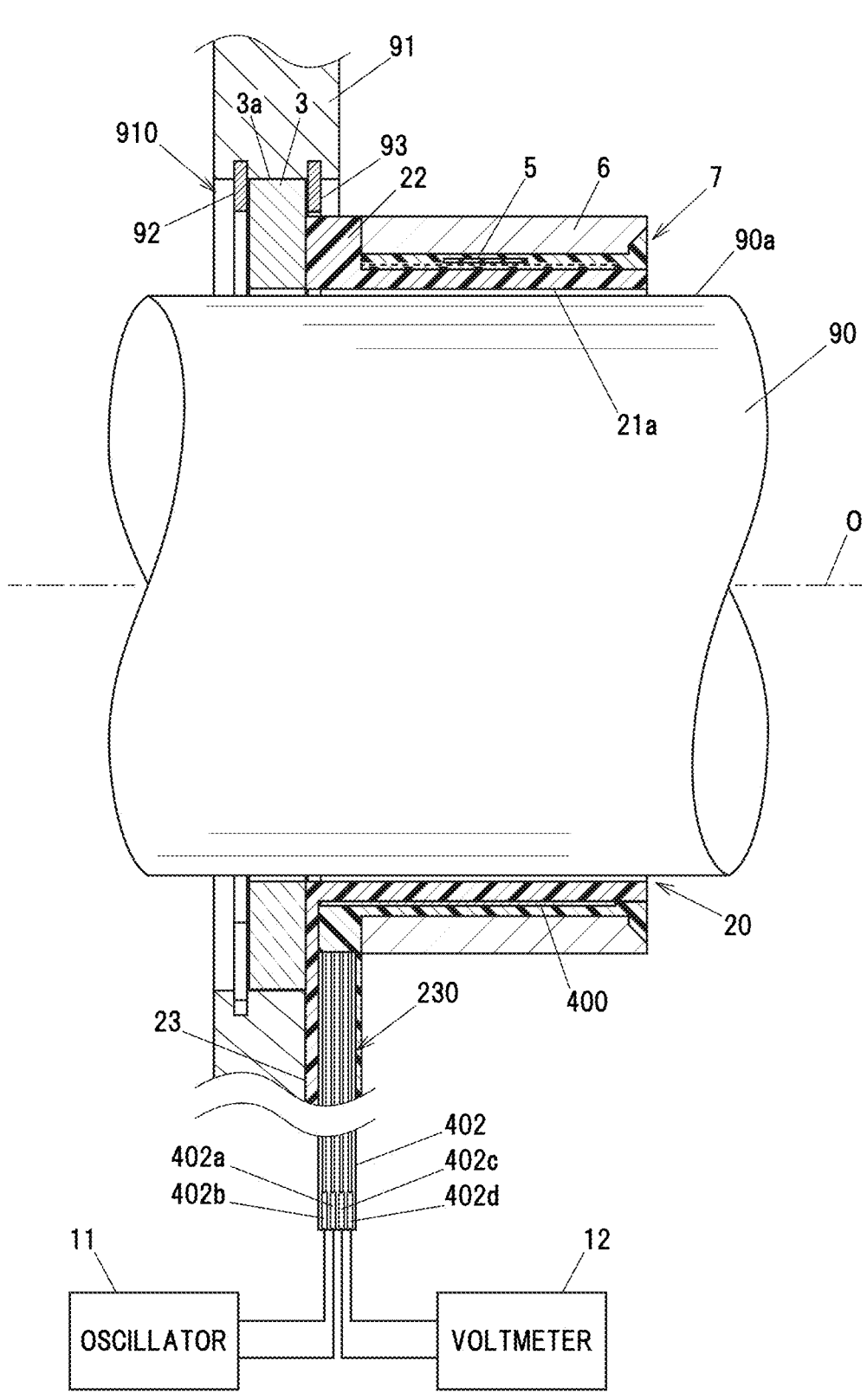
FIG. 5 is a cross-sectional view showing the magnetostrictive torque sensor attached to the transmission case, which is shown together with a rotating shaft whose torque is to be detected.

FIGS. 1A and 1B are perspective views showing a magnetostrictive torque sensor 1 in an embodiment of the invention. FIG. 2 is a perspective view showing components of the magnetostrictive torque sensor 1 that are arranged vertically. FIG. 3 is a cross-sectional view showing the magnetostrictive torque sensor 1 taken along line A-A in FIG. 1A. FIG. 4 is a perspective view showing the magnetostrictive torque sensor 1 attached to a transmission case 91 which is an attachment target. FIG. 5 is a cross-sectional view showing the magnetostrictive torque sensor 1 attached to the transmission case 91, which is shown together with a rotating shaft 90 whose torque is to be detected.

The magnetostrictive torque sensor 1 is attached around the rotating shaft 90, as shown in FIG. 5, and detects torque transmitted by the rotating shaft 90 in a predetermined operating temperature range. The rotating shaft 90 is, e.g., a shaft that transmits a driving force of a drive source such as an automobile engine or electric motor. The torque detection result obtained by the magnetostrictive torque sensor 1 is used to control the drive source or an automatic transmission, etc.

The rotating shaft 90 is a ferromagnetic material exhibiting a magnetostrictive effect, and rotates around a rotation axis O to transmit torque. Here, the magnetostrictive effect is a phenomenon in which the shape of a ferromagnetic material is distorted when the ferromagnetic material is magnetized by applying a magnetic field. By using this phenomenon in an opposite manner and detecting a magnetic field generated due to distortion of the shape using the magnetostrictive torque sensor 1, it is possible to detect torque applied to the rotating shaft 90. It is possible to suitably use the rotating shaft 90 obtained by, e.g., carburizing, quenching and tempering a shaft-shaped body made of chrome steel containing chrome, such as a chrome steel, a chrome-molybdenum steel or a nickel-chrome molybdenum steel, and further performing shot peening. Hereinafter, a direction parallel to the rotation axis O of the rotating shaft 90 will be referred to as an axial direction.

The magnetostrictive torque sensor 1 includes a bobbin 2 that is a molded resin body having a cylinder portion 21 with a hollow cavity 20 in the center through which the rotating shaft 90 is inserted, a metal bracket 3 fixed to the bobbin 2, a flexible substrate 4 wrapped around the outer circumference of the cylinder portion 21 of the bobbin 2, a tape 5 to fasten the flexible substrate 4 in a curved state, a cylindrical magnetic ring 6 that houses the flexible substrate 4 between the magnetic ring and the cylinder portion 21 of the bobbin 2, and a filler 7 made of a curable resin filled between the cylinder portion 21 of the bobbin 2, the flexible substrate 4 and the magnetic ring 6. On the flexible substrate 4, plural detection coils to detect distortion of the rotating shaft 90 are formed by wiring patterns.

The bobbin 2 is made of, e.g., PPS (polyphenylene sulfide) and is injection molded so as to be integrated with the metal bracket 3. The metal bracket 3 has a ring shape centered on the rotation axis O and has axially extending through-holes 30 formed at plural locations in a circumferential direction. The bobbin 2 integrally has the cylinder portion 21, an annular flange portion 22 having a larger outer diameter than the cylinder portion 21, an extension portion 23 extending from an outer circumferential surface 22a of the flange portion 22 in a radial direction perpendicular to the axial direction, plural leg portions 24 protruding from plural locations of the flange portion 22 in the axial direction toward the side opposite to the cylinder portion 21, and bulged portions 25 provided at respective ends of the plural leg portions 24. The plural leg portions 24 are formed in a columnar shape extending in the plural through-holes 30 of the metal bracket 3, and the bulged portions 25 are formed in a disk shape with a larger diameter than the leg portions 24.

The metal bracket 3 is stopped from coming off from the leg portions 24 by the bulged portions 25. An outer circumferential surface 3a of the metal bracket 3 is formed parallel to the rotation axis O. The inner diameter of the metal bracket 3 is equal to the inner diameter of the cylinder portion 21 of the bobbin 2. The metal bracket 3 is used to position and secure the magnetostrictive torque sensor 1 to the transmission case 91. The transmission case 91 is, e.g., made of a metal such as aluminum alloy.

Figure 6:
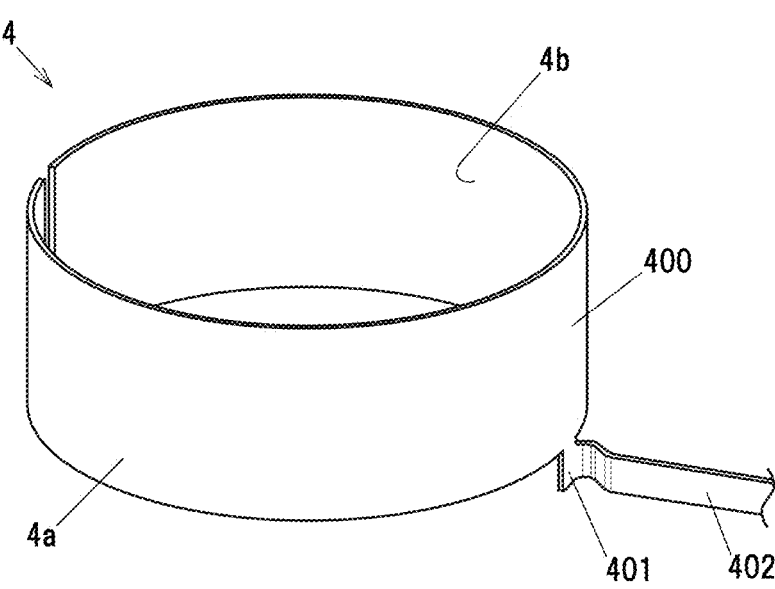
FIG. 6 is a perspective view showing a flexible substrate curved in a cylindrical shape.
Figure 7:
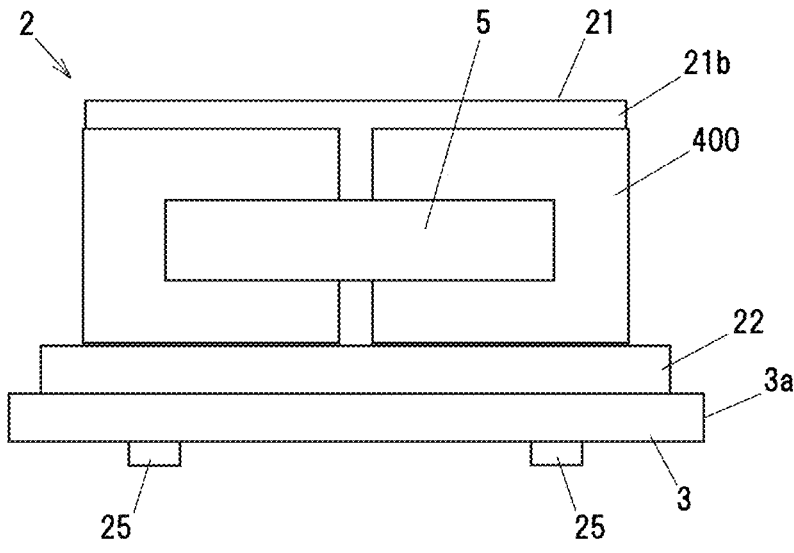
FIG. 7 is a configuration diagram illustrating the flexible substrate wrapped around an outer circumference of a cylinder portion of a bobbin, which is shown together with a tape.

FIG. 6 is a perspective view showing the flexible substrate 4 curved in a cylindrical shape. FIG. 7 is a configuration diagram illustrating the flexible substrate 4 wrapped around the outer circumference of the cylinder portion 21 of the bobbin 2, which is shown together with the tape 5. The flexible substrate 4 has a band-shaped portion 400 extending in the circumferential direction of the cylinder portion 21 of the bobbin 2, a tongue portion 401 protruding in the axial direction from one location of the band-shaped portion 400, and a linear portion 402 extending from the tongue portion 401. Both longitudinal ends of the band-shaped portion 400 are fastened with the tape 5. The tape 5 is, e.g., a fluoroplastic adhesive tape having an adhesive layer and is stretchable. The band-shaped portion 400 of the flexible substrate 4 is maintained in a cylindrically curved state by the tape 5 in a state before the filler 7 is filled and solidified.

A groove 230 to house the linear portion 402 of the flexible substrate 4 is formed on the extension portion 23 of the bobbin 2. The filler 7 is also filled in the groove 230, and the linear portion 402 is fixed in the groove 230 by the filler 7 filled in the groove 230. The linear portion 402 extends longer than the extension portion 23 of the bobbin 2, and as shown in FIG. 5, first and second electrodes 402a, 402b provided at an end of the linear portion 402 are electrically connected to an oscillator 11 and third and fourth electrodes 402c, 402d are electrically connected to a voltmeter 12.

The magnetic ring 6 is made of, e.g., steel or a sintered magnetic material, has soft magnetic properties, and is formed in a cylindrical shape with an inner diameter larger than the outer diameter of the cylinder portion 21 of the bobbin 2. When the magnetic ring 6 is made of steel, a magnetic steel material such as electromagnetic stainless steel can be suitably used and, e.g., deep drawing can be used as the forming method. Alternatively, the magnetic ring 6 may be formed by cutting a long pipe-shaped steel material to a predetermined length. One axial end of the magnetic ring 6 is in contact with the flange portion 22 of the bobbin 2.

In the present embodiment, the filler 7 is made of a thermosetting resin, more specifically, made of a thermosetting epoxy resin. A portion of the filler 7 is formed as a locking portion 71 to stop the magnetic ring 6 from coming off from the cylinder portion 21 of the bobbin 2. The locking portion 71 restrains the magnetic ring 6 from moving in the axial direction away from the flange portion 22 of the bobbin 2. In the present embodiment, an annular recessed portion 60 is formed at an end of the magnetic ring 6 on the side opposite to the flange portion 22, and the filler 7 entered the recessed portion 60 serves as the locking portion 71.

The epoxy resin has an adhesive effect, and adhesion of the magnetic ring 6 to the cylinder portion 21 of the bobbin 2 by the filler 7 suppresses the axial movement of the magnetic ring 6 relative to the bobbin 2, and in addition to this, a portion of the filler 7 serves as the locking portion 71 and the magnetic ring 6 is thus stopped from coming off more reliably. In addition, the adhesiveness and tight contact properties of the epoxy resin prevent water from entering between the cylinder portion 21 of the bobbin 2 and the magnetic ring 6, and high water-stopping properties are thereby exhibited.

As shown in FIGS. 4 and 5, the magnetostrictive torque sensor 1 is positioned by fitting the metal bracket 3 into a fitting hole 910 formed on the transmission case 91 and is secured by a pair of retaining rings 92 and 93 attached to the fitting hole 910. The retaining rings 92 and 93 are snap rings and are attached so as to sandwich the metal bracket 3 in the axial direction. When the magnetostrictive torque sensor 1 is attached to the transmission case 91, a central axis C of the cylinder portion 21 of the bobbin 2 coincides with the rotation axis O of the rotating shaft 90. An inner circumferential surface 21a of the cylinder portion 21 faces an outer circumferential surface 90a of the rotating shaft 90 with a slight gap therebetween.

The metal bracket 3 is less prone to thermal expansion or thermal contraction than the bobbin 2 and is less likely to wear out than the bobbin 2. Therefore, by positioning the magnetostrictive torque sensor 1 relative to the transmission case 91 by fitting the metal bracket 3, positioning accuracy can be improved as compared to when positioning the magnetostrictive torque sensor 1 by, e.g., fitting the flange portion 22 of the bobbin 2. The outer circumferential end portion of the metal bracket 3 including the outer circumferential surface 3a is the largest outer diameter portion of the magnetostrictive torque sensor 1.

Figure 8:
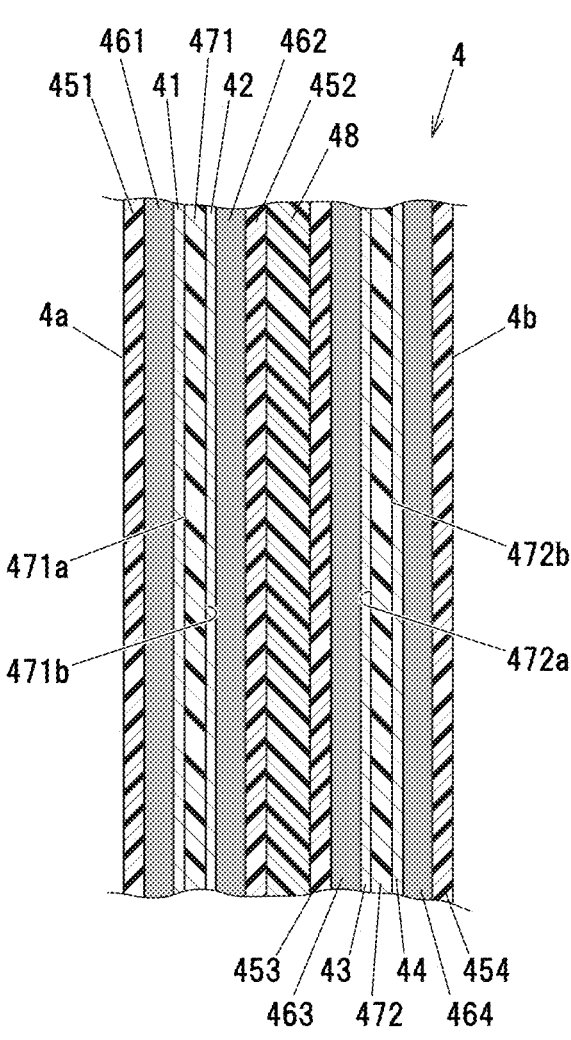
FIG. 8 is a cross-sectional view showing a band-shaped portion of the flexible substrate.

FIG. 8 is a cross-sectional view showing the band-shaped portion 400 of the flexible substrate 4. The flexible substrate 4 has a multilayer structure which has first to fourth wiring layers 41 to 44 and in which a coverlay film 451, an adhesive layer 461, the first wiring layer 41, a first base film 471, the second wiring layer 42, an adhesive layer 462, a coverlay film 452, a double-sided tape 48, a coverlay film 453, an adhesive layer 463, the third wiring layer 43, a second base film 472, the fourth wiring layer 44, an adhesive layer 464 and a coverlay film 454 are stacked in this order from one surface 4a on the outer side of the curve to the other surface 4b on the inner side of the curve.

The first wiring layer 41 and the second wiring layer 42 are wiring patterns formed by etching copper foil and are respectively formed on a front surface 471a and a back surface 471b of the first base film 471. Likewise, the third wiring layer 43 and the fourth wiring layer 44 are wiring patterns formed by etching copper foil and are respectively formed on a front surface 472a and a back surface 472b of the second base film 472. The coverlay films 451, 452, 453, 454 are protective films adhered to the first to fourth wiring layers 41 to 44 by the adhesive layers 461, 462, 463, 464. The first and second base films 471, 472 and the coverlay films 451, 452, 453, 454 are made of an insulating resin such as polyimide. The double-sided tape 48 is, e.g., an acrylic tape.

Figures 9A, 9B, 9C, 9D:
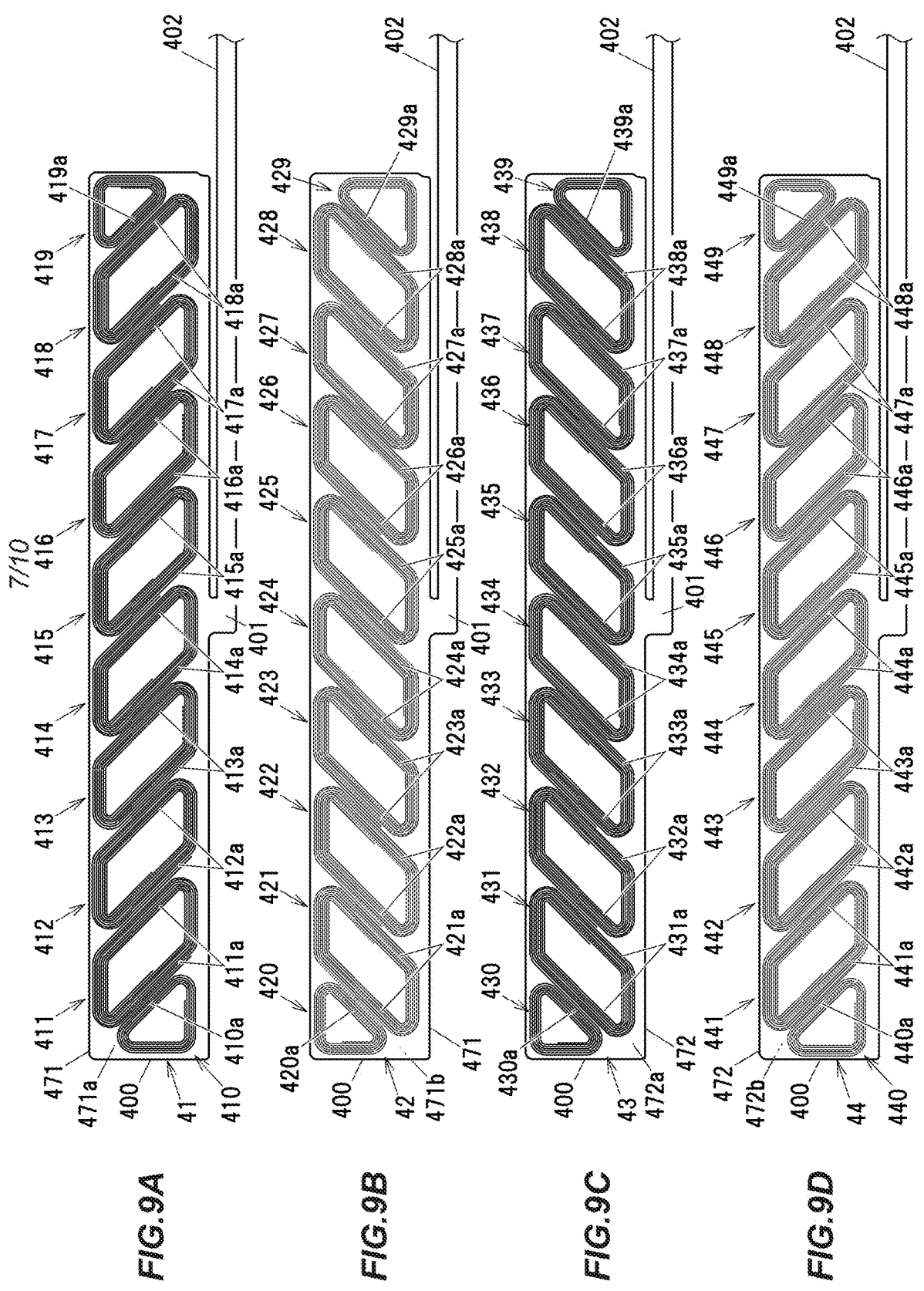
FIGS. 9A to 9D are plan views showing wiring patterns of first to fourth wiring layers of the flexible substrate.

FIG. 9A is a plan view showing a wiring pattern of the first wiring layer 41 formed on the front surface 471a of the first base film 471. FIG. 9B is a plan view showing a wiring pattern of the second wiring layer 42 when viewed from the front surface 471a side of the first base film 471. FIG. 9C is a plan view showing a wiring pattern of the third wiring layer 43 formed on the front surface 472a of the second base film 472. FIG. 9D is a plan view showing a wiring pattern of the fourth wiring layer 44 when viewed from the front surface 472a side of the second base film 472.

On the first wiring layer 41, first to tenth detection coils 410 to 419 aligned in the longitudinal direction of the band-shaped portion 400 are composed of a wiring pattern. The first and tenth detection coils 410 and 419 have a triangular shape, and the second to ninth detection coils 411 to 418 have a parallelogram shape. Likewise, on the second wiring layer 42, first to tenth detection coils 420 to 429 aligned in the longitudinal direction of the band-shaped portion 400 are composed of a wiring pattern. The first and tenth detection coils 420 and 429 have a triangular shape, and the second to ninth detection coils 421 to 428 have a parallelogram shape.

On the third wiring layer 43, first to tenth detection coils 430 to 439 aligned in the longitudinal direction of the band-shaped portion 400 are composed of a wiring pattern. The first and tenth detection coils 430 and 439 have a triangular shape, and the second to ninth detection coils 431 to 438 have a parallelogram shape. Likewise, on the fourth wiring layer 44, first to tenth detection coils 440 to 449 aligned in the longitudinal direction of the band-shaped portion 400 are composed of a wiring pattern. The first and tenth detection coils 440 and 449 have a triangular shape, and the second to ninth detection coils 441 to 448 have a parallelogram shape.

The first to tenth detection coils 410 to 419 of the first wiring layer 41 and the first to tenth detection coils 440 to 449 of the fourth wiring layer 44 respectively have straight portions 410a to 419a and 440a to 449a which are inclined toward one side at a predetermined angle (+45°) relative to the lateral direction of the band-shaped portion 400. The first to tenth detection coils 420 to 429 of the second wiring layer 42 and the first to tenth detection coils 430 to 439 of the third wiring layer 43 have respectively straight sections 420a to 429a and 430a to 439a which are inclined toward the other side at the predetermined angle (−45°) relative to the lateral direction of the band-shaped portion 400.

Figure 10:
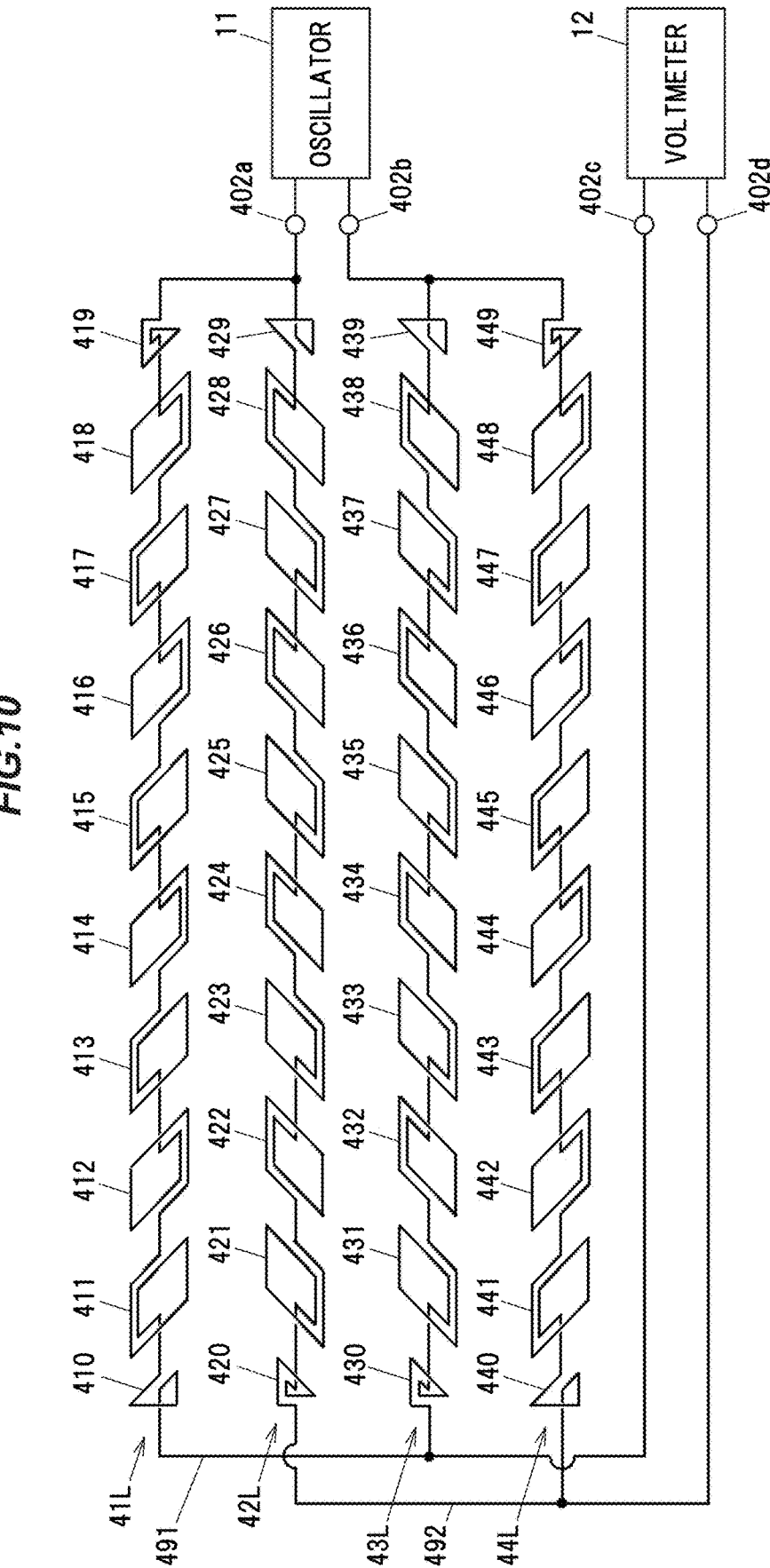
FIG. 10 is a schematic circuit diagram showing a configuration example of an electric circuit composed of the flexible substrate, an oscillator and a voltmeter.

FIG. 10 is a schematic circuit diagram showing a configuration example of an electric circuit composed of the flexible substrate 4, the oscillator 11, and the voltmeter 12. The first to tenth detection coils 410 to 419 of the first wiring layer 41 are connected in series to form a first inductive load 41L, and the first to tenth detection coils 420 to 429 of the second wiring layer 42 are connected in series to form a second inductive load 42L. Likewise, the first to tenth detection coils 430 to 439 of the third wiring layer 43 are connected in series to form a third inductive load 43L, and the first to tenth detection coils 440 to 449 of the fourth wiring layer 44 are connected in series to form a fourth inductive load 44L.

The first inductive load 41L and the third inductive load 43L, as well as the second inductive load 42L and the fourth inductive load 44L, are connected respectively in series between the first electrode 402a and the second electrode 402b. A connection line 491 connecting the first inductive load 41L to the third inductive load 43L is connected to the third electrode 402c, and a connection line 492 connecting the second inductive load 42L to the fourth inductive load 44L is connected to the fourth electrode 402d. The oscillator 11 applies an AC voltage between the first electrode 402a and the second electrode 402b. The voltmeter 12 measures a voltage between the third electrode 402c and the fourth electrode 402d.

When torque is applied to the rotating shaft 90, magnetic permeability in the direction at +45 degrees from the axial direction decreases (or increases) and magnetic permeability in the direction at −45 degrees from the axial direction increases (or decreases). Therefore, when torque is applied to the rotating shaft 90 in a state in which AC voltage is applied from the oscillator 11, inductances of the first inductive load 41L and the fourth inductive load 44L decrease (or increase) and inductances of the second inductive load 42L and the third inductive load 43L increase (or decrease). Since this results in a change in the voltage measured by the voltmeter 12, the torque applied to the rotating shaft 90 can be detected based on this change in voltage.

Note that FIGS. 9A to 9D do not show portions of the wiring patterns that connect in series between the first to tenth detection coils 410 to 419, 420 to 429, 430 to 439 and 440 to 449 of the first to fourth wiring layers 41 to 44, the connection lines 491, 492, and wiring patterns between these circuit elements and the first to fourth electrodes 402a to 402d.

When the flexible substrate 4 configured as described above is pressed and compressed in the thickness direction, the capacitance between the first to fourth wiring layers 41 to 44 changes, resulting in errors in torque detection accuracy. In the present embodiment, the linear expansion coefficient of the bobbin 2 is higher than the linear expansion coefficient of the magnetic ring 6, the bobbin 2 thermally expands at a higher rate than the magnetic ring 6 as the temperature of the magnetostrictive torque sensor 1 rises, and the band-shaped portion 400 of the flexible substrate 4 is pressed toward the magnetic ring 6 by the cylinder portion 21 of the bobbin 2.

For this reason, in the present embodiment, during manufacturing of the magnetostrictive torque sensor 1, curing of the filler 7 is performed in a state in which temperature of the cylinder portion 21 of the bobbin 2, the band-shaped portion 400 of the flexible substrate 4 and the magnetic ring 6 is higher than the upper limit temperature of the operating temperature range of the magnetostrictive torque sensor 1. The upper limit temperature of the operating temperature range here is the rated temperature of the magnetostrictive torque sensor 1 and is, e.g., 120° C.

By curing the filler 7 in this manner, the band-shaped portion 400 of the flexible substrate 4 is not pressed toward the magnetic ring 6 due to thermal expansion of the bobbin 2 within the operating temperature range of the magnetostrictive torque sensor 1. In the present embodiment, a thermosetting resin with a curing temperature higher than the upper limit temperature of the operating temperature range of the magnetostrictive torque sensor 1 is used as the filler 7. This allows for curing of the filler 7 in the state in which the temperature of the cylinder portion 21 of the bobbin 2, the band-shaped portion 400 of the flexible substrate 4 and the magnetic ring 6 is higher than the upper limit temperature of the operating temperature range of the magnetostrictive torque sensor 1. The curing temperature of the filler 7 is, e.g., 150° C.

A linear expansion coefficient of the filler 7 is desirably lower than the linear expansion coefficient of the bobbin 2 and higher than the linear expansion coefficient of the magnetic ring 6. Since the linear expansion coefficient of the filler 7 is lower than the linear expansion coefficient of the bobbin 2 and higher than the linear expansion coefficient of the magnetic ring 6, it is possible to prevent formation of a gap (space) between the filler 7 and the cylinder portion 21 of the bobbin 2 or between the filler 7 and the magnetic ring 6 due to a difference in linear expansion coefficient while suppressing pressing of the band-shaped portion 400 of the flexible substrate 4 in the thickness direction at high temperatures.

In the present embodiment, a relationship between CTE1, CTE2, CTE3 and CTE4 is CTE1>CTE2>CTE3>CTE4, where CTE1 is the linear expansion coefficient of the bobbin 2, CTE2 is the linear expansion coefficient of the flexible substrate 4, CTE3 is the linear expansion coefficient of the filler 7, and CTE4 is the linear expansion coefficient of the magnetic ring 6. CTE1 is, e.g., not less than 25 ppm/° C. CTE2 is, e.g., 20 ppm/° C., CTE3 is, e.g., 15 ppm/° C., and CTE4 is, e.g., 11 ppm/° C.

Next, a method for manufacturing the magnetostrictive torque sensor 1 will be described in reference to FIG. 11. The method for manufacturing the magnetostrictive torque sensor 1 includes a preparation step of preparing the bobbin 2 with the metal bracket 3 fixed thereto, the flexible substrate 4, and the magnetic ring 6, an arrangement step of wrapping the band-shaped portion 400 of the flexible substrate 4 around the outer circumference of the cylinder portion 21 of the bobbin 2 and placing the magnetic ring 6 around the outer circumference of the cylinder portion 21 of the bobbin 2 and the band-shaped portion 400 of the flexible substrate 4, and a curing step of curing the filler 7 filled between the cylinder portion 21 of the bobbin 2, the band-shaped portion 400 of the flexible substrate 4 and the magnetic ring 6 in a state in which the temperature of the cylinder portion 21 of the bobbin 2, the band-shaped portion 400 of the flexible substrate 4 and the magnetic ring 6 is elevated to higher than the upper limit temperature of the operating temperature range of the magnetostrictive torque sensor 1.

In the arrangement step, both longitudinal ends of the band-shaped portion 400 are fastened with the tape 5 so that no gap is formed between the band-shaped portion 400 of the flexible substrate 4 and an outer circumferential surface 21b of the cylinder portion 21 of the bobbin 2. At this time, by fastening the both longitudinal ends of the band-shaped portion 400 with the tape 5 in a state in which the tape 5 is elastically stretched, the other surface 4b of the flexible substrate 4 at the band-shaped portion 400 can come into tight contact with the outer circumferential surface 21b of the cylinder portion 21. The tape 5 is applied in such a manner that one end adheres to one end of the band-shaped portion 400 and the other end adheres to the other end of the band-shaped portion 400.

Figure 11:
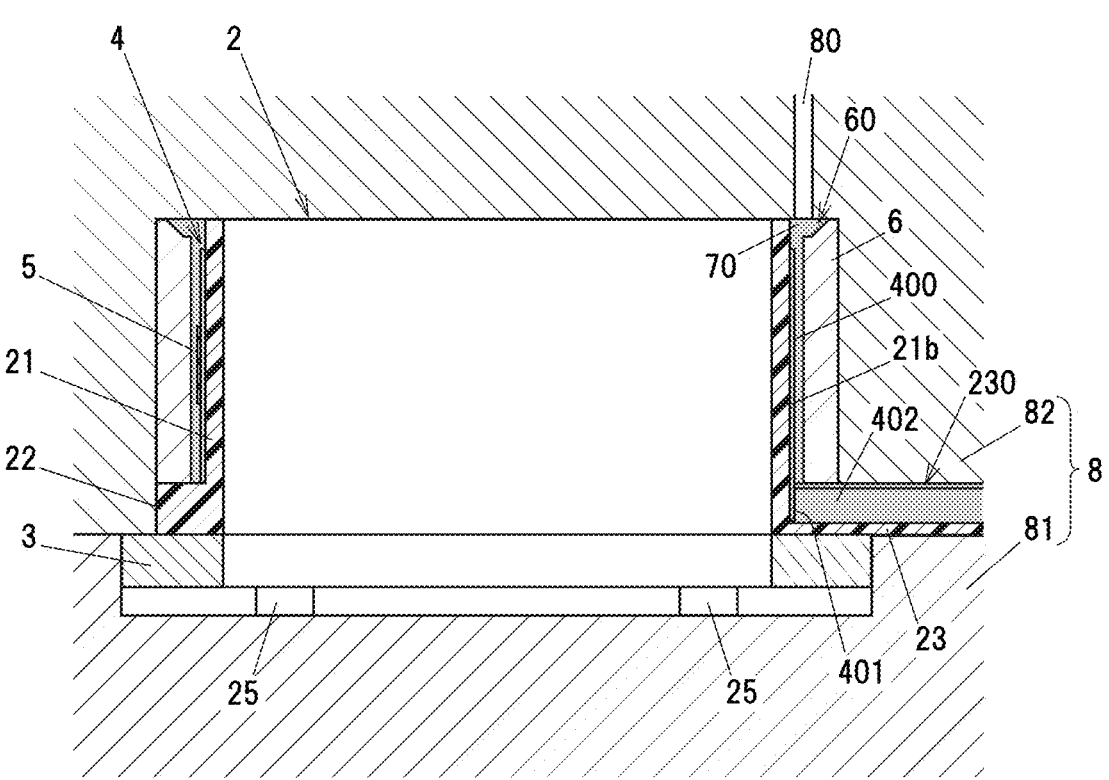
FIG. 11 is an explanatory diagram illustrating a curing step in a method for manufacturing the magnetostrictive torque sensor.

FIG. 11 is an explanatory diagram illustrating the curing step. In the curing step, a mold 8 having a lower mold 81 and an upper mold 82 is used, and after filling between the cylinder portion 21 of the bobbin 2, the band-shaped portion 400 of the flexible substrate 4 and the magnetic ring 6 with the filler 7 which is in liquid form before curing, the filler 7 is cured by raising temperature of the filler 7 to higher than the upper limit temperature of the operating temperature range. In FIG. 11, a liquid resin 70, which is the filler 7 in liquid form before curing, is shown in gray. The liquid resin 70 is highly flowable, is injected through an injection hole 80, and flows in between the cylinder portion 21 of the bobbin 2, the band-shaped portion 400 of the flexible substrate 4 and the magnetic ring 6. The liquid resin 70 also flows into the groove 230 formed on the extension portion 23 of the bobbin 2.

The bobbin 2, the flexible substrate 4, the magnetic ring 6 and the liquid resin 70 can be heated, e.g., by heating the lower mold 81 and the upper mold 82 with a heater. It is desirable to inject the liquid resin 70 in a state in which the temperature of the bobbin 2, the flexible substrate 4, the magnetic ring 6, the lower mold 81 and the upper mold 82 is lower than the curing temperature of the filler 7 to prevent the liquid resin 70 from curing before the liquid resin 70 is completely filled.

Modification

Figure 12:
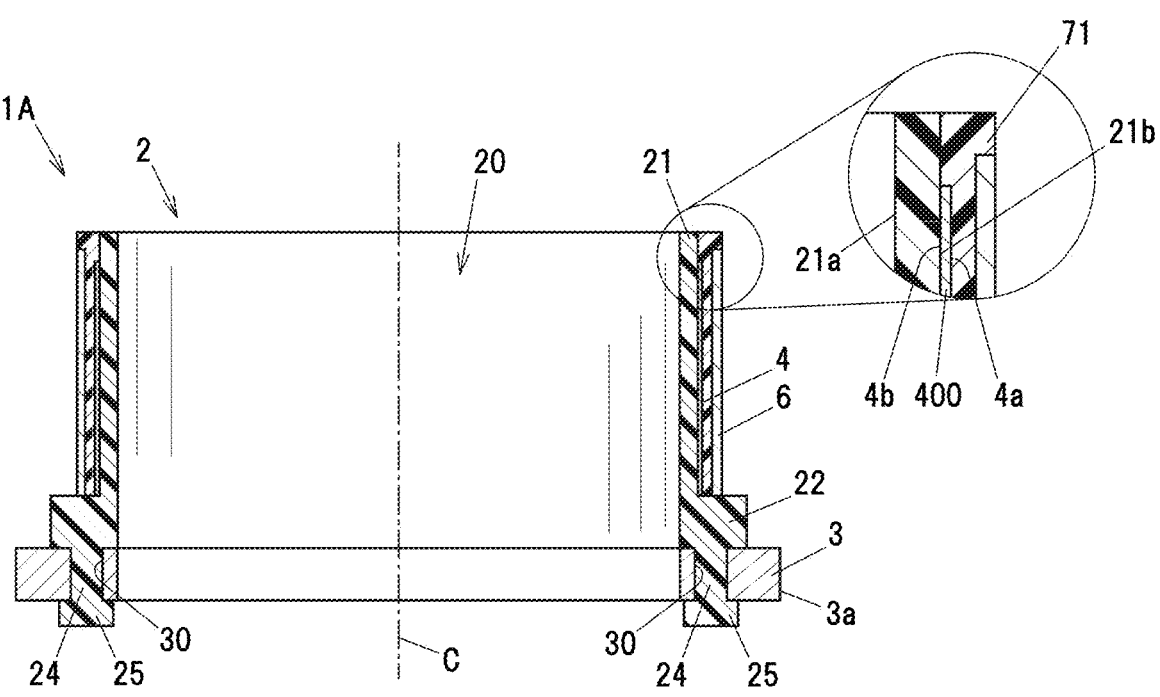
FIG. 12 is a cross-sectional view showing the magnetostrictive torque sensor in a modification.

FIG. 12 is a cross-sectional view showing a magnetostrictive torque sensor 1A in a modification. In the example described in the above embodiment, the annular recessed portion 60 is formed on the magnetic ring 6 and the filler 7 entered the recessed portion 60 serves as the locking portion 71. In contrast, in the magnetostrictive torque sensor 1A in the modification, the magnetic ring 6 has a simple cylindrical shape without unevenness, a portion of the filler 7 covers the end of the magnetic ring 6 on the side opposite to the flange portion 22, and this portion of the filler 7 serves as the locking portion 71. This magnetostrictive torque sensor 1A can be manufactured by the same manufacturing method as that described above, and the same effects as in the above embodiment can be obtained. It is also possible to process the magnetic ring 6 more easily, allowing for further cost reduction.

Summary of the Embodiment and Modification

Technical ideas understood from the embodiment and modification will be described below citing the reference signs, etc., used for the embodiment and modification. However, each reference sign, etc., described below is not intended to limit the constituent elements in the claims to the members, etc., specifically described in the embodiment and modifications.

According to the first feature, a magnetostrictive torque sensor 1, 1A, which is attached around a rotating shaft 90 exhibiting a magnetostrictive effect and detects torque transmitted by the rotating shaft 90 in a predetermined operating temperature range, comprises: a molded resin body (bobbin) 2 comprising a cylinder portion 21 with a hollow cavity 20 in the center through which the rotating shaft 90 is inserted; a flexible substrate 4 that is wrapped around an outer circumference of the cylinder portion 21 of the molded resin body 2 and comprises a plurality of detection coils 410-449 composed of a wiring pattern; a cylindrical magnetic ring 6 that houses the flexible substrate 4 between the magnetic ring and the cylinder portion 21; and a filler 7 comprising a curable resin filled between the cylinder portion 21, the flexible substrate 4 and the magnetic ring 6, wherein a linear expansion coefficient of the molded resin body 2 is higher than a linear expansion coefficient of the magnetic ring 6, and wherein the filler 7 is cured in a state in which temperatures of the cylinder portion 21, the flexible substrate 4, and the magnetic ring 6 are elevated to higher than an upper limit temperature of the operating temperature range.

According to the second feature, in the magnetostrictive torque sensor 1, 1A as described by the first feature, a linear expansion coefficient of the filler 7 is lower than the linear expansion coefficient of the molded resin body 2 and higher than the linear expansion coefficient of the magnetic ring 6.

According to the third feature, in the magnetostrictive torque sensor 1, 1A as described by the first feature, the filler 7 comprises a thermosetting resin with a curing temperature higher than the upper limit temperature.

According to the fourth feature, in the magnetostrictive torque sensor 1, 1A as described by the first feature, the flexible substrate 4 comprises a band-shaped portion 400 extending in a circumferential direction of the cylinder portion 21, and both longitudinal ends of the band-shaped portion 400 are fastened with a tape 5.

According to the fifth feature, in the magnetostrictive torque sensor 1, 1A as described by the first feature, the filler 7 comprises a locking portion 71 to stop the magnetic ring 6 from coming off.

According to the sixth feature, a method for manufacturing a magnetostrictive torque sensor 1, 1A, which is attached around a rotating shaft 90 exhibiting a magnetostrictive effect and detects torque transmitted by the rotating shaft 90 in a predetermined operating temperature range, comprises: preparing a molded resin body 2 comprising a cylinder portion 21 with a hollow cavity 20 in the center through which the rotating shaft 90 is inserted, a flexible substrate 4 comprising a plurality of detection coils 410-449 composed of a wiring pattern, and a cylindrical magnetic ring 6 having a lower linear expansion coefficient than the molded resin body 2; arranging the flexible substrate 4 and the magnetic ring 6 by wrapping the flexible substrate 4 around an outer circumference of the cylinder portion 21 and placing the magnetic ring 6 around the outer circumference of the cylinder portion 21 and the flexible substrate 4; and curing a filler 7 comprising a curable resin filled between the cylinder portion 21, the flexible substrate 4 and the magnetic ring 6 in a state in which temperatures of the cylinder portion 21, the flexible substrate 4, and the magnetic ring 6 are elevated to higher than an upper limit temperature of an operating temperature range.

According to the seventh feature, in the method for manufacturing a magnetostrictive torque sensor 1, 1A as described by the sixth feature, the filler 7 comprises a thermosetting resin with a curing temperature higher than the upper limit temperature, and wherein in the curing, after filling between the cylinder portion 21, the flexible substrate 4 and the magnetic ring 6 with the filler 7 in liquid form before curing, the filler 7 is cured by raising temperature thereof to higher than the upper limit temperature.

According to the eighth feature, in the method for manufacturing a magnetostrictive torque sensor 1, 1A as described by the sixth feature, the flexible substrate 4 comprises a band-shaped portion 400 extending in a circumferential direction of the cylinder portion 21, and wherein in the arranging, both longitudinal ends of the band-shaped portion 400 of the flexible substrate 4 are fastened with a tape 5.

Although the embodiment and modification of the invention have been described, the invention according to claims is not to be limited to the embodiment and modification described above. Further, please note that not all combinations of the features described in the embodiment are necessary to solve the problem of the invention.

In addition, the invention can be appropriately modified and implemented without departing from the gist thereof. For example, although the example in which the filler 7 is a thermosetting resin has been described in the above embodiment, it is not limited thereto and the filler 7 maybe, e.g., a photo-curable resin or a chemically curable resin. In addition, although the example in which the rotating shaft 90 subjected to detection by the magnetostrictive torque sensor 1 is a shaft transmitting a driving force of a drive source of an automobile has been described in the above embodiment, the object subjected to detection by the magnetostrictive torque sensor 1 is not limited thereto. For example, torque of a rotating shaft which transmits torque in industrial machinery can be detected by the magnetostrictive torque sensor 1.

The invention claimed is:

1. A magnetostrictive torque sensor that is configured to be attached around a rotating shaft exhibiting a magnetostrictive effect and detects torque transmitted by the rotating shaft in a predetermined operating temperature range, the magnetostrictive torque sensor comprising:

a molded resin body comprising a cylinder portion with a hollow cavity in a center through which the rotating shaft is inserted;

a flexible substrate that is wrapped around an outer circumference of the cylinder portion of the molded resin body and comprises a plurality of detection coils composed of a wiring pattern;

a cylindrical magnetic ring that houses the flexible substrate between the magnetic ring and the cylinder portion; and a filler comprising a curable resin filled between the cylinder portion, the flexible substrate, and the magnetic ring, wherein a linear expansion coefficient of the molded resin body is higher than a linear expansion coefficient of the magnetic ring, and wherein the filler is cured in a state in which temperatures of the cylinder portion, the flexible substrate, and the magnetic ring are elevated to higher than an upper limit temperature of the operating temperature range.

2. The magnetostrictive torque sensor according to claim 1, wherein a linear expansion coefficient of the filler is lower than the linear expansion coefficient of the molded resin body and higher than the linear expansion coefficient of the magnetic ring.

3. The magnetostrictive torque sensor according to claim 1, wherein the filler comprises a thermosetting resin with a curing temperature higher than the upper limit temperature.

4. The magnetostrictive torque sensor according to claim 1, wherein the flexible substrate comprises a band-shaped portion extending in a circumferential direction of the cylinder portion, and both longitudinal ends of the band-shaped portion are fastened with a tape.

5. The magnetostrictive torque sensor according to claim 1, wherein the filler comprises a locking portion to stop the magnetic ring from coming off.

6. A method for manufacturing a magnetostrictive torque sensor that is configured to be attached around a rotating shaft exhibiting a magnetostrictive effect and detects torque transmitted by the rotating shaft in a predetermined operating temperature range, the method comprising:

preparing a molded resin body comprising a cylinder portion with a hollow cavity in a center through which the rotating shaft is inserted, a flexible substrate comprising a plurality of detection coils composed of a wiring pattern, and a cylindrical magnetic ring having a lower linear expansion coefficient than the molded resin body;

arranging the flexible substrate and the magnetic ring by wrapping the flexible substrate around an outer circumference of the cylinder portion and placing the magnetic ring around the outer circumference of the cylinder portion and the flexible substrate; and curing a filler comprising a curable resin filled between the cylinder portion, the flexible substrate, and the magnetic ring in a state in which temperatures of the cylinder portion, the flexible substrate and the magnetic ring are elevated to higher than an upper limit temperature of an operating temperature range.

7. The method according to claim 6, wherein the filler comprises a thermosetting resin with a curing temperature higher than the upper limit temperature, and wherein in the curing, after filling between the cylinder portion, the flexible substrate and the magnetic ring with the filler in liquid form before curing, the filler is cured by raising temperature thereof to higher than the upper limit temperature.

8. The method according to claim 6, wherein the flexible substrate comprises a band-shaped portion extending in a circumferential direction of the cylinder portion, and wherein in the arranging, both longitudinal ends of the band-shaped portion of the flexible substrate are fastened with a tape.

* * * * *